(12) United States Patent
Rufus et al.

(10) Patent No.: US 12,252,883 B2
(45) Date of Patent: *Mar. 18, 2025

(54) SELF-ADHERED ROOFING SYSTEMS AND METHODS

(71) Applicant: BMIC LLC, Dallas, TX (US)

(72) Inventors: Isaac Bernard Rufus, Newark, DE (US); Adem Chich, Kearny, NJ (US); Richard Chin, Livingston, NJ (US); Michael Dougherty, Mount Arlington, NJ (US)

(73) Assignee: BMIC LLC, Dallas, TX (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/819,967

(22) Filed: Aug. 16, 2022

(65) Prior Publication Data
US 2022/0389717 A1 Dec. 8, 2022

Related U.S. Application Data

(63) Continuation-in-part of application No. 17/515,812, filed on Nov. 1, 2021, now Pat. No. 11,441,316.
(Continued)

(51) Int. Cl.
*E04D 12/00* (2006.01)
*B32B 3/10* (2006.01)
(Continued)

(52) U.S. Cl.
CPC ............ *E04D 12/002* (2013.01); *B32B 3/10* (2013.01); *B32B 5/022* (2013.01); *B32B 5/08* (2013.01);
(Continued)

(58) Field of Classification Search
CPC ......... E04D 12/002; E04D 5/10; E04D 5/148; E04D 1/28; E04D 1/18; E04D 1/20;
(Continued)

(56) References Cited

U.S. PATENT DOCUMENTS 3,726,754 A * 4/1973 Coglianese ............. B32B 25/08
428/319.7
3,844,878 A * 10/1974 Price ........................ E04D 5/10
428/921
(Continued)

FOREIGN PATENT DOCUMENTS

WO 2010/070466 A1 ‡ 6/2010
WO 2015/126931 A1 ‡ 8/2015

OTHER PUBLICATIONS

Strong, Boral Roofing Introduces Sol-R-Skin Blue Roof Underlayment, Builder Magazine <<https://www.builderonline.com/products/exteriors/boral-roofing-introduces-sol-r-skin-blue-roof-underlayment_o">> retrieved Nov. 10, 2021.

*Primary Examiner* — Kyle J. Walraed-Sullivan
(74) *Attorney, Agent, or Firm* — GREENBERG TRAURIG, LLP (57) ABSTRACT

Some embodiments of the present disclosure relate to roofing systems. In some embodiments, the roofing system includes a deck, a roofing material, and an underlayment configured to be positioned between the roofing material and the deck. In some embodiments, the underlayment comprises a foil layer and an adhesive layer that is attached to the foil layer and configured to be attached to the deck. Methods of manufacturing roofing systems are also disclosed.

9 Claims, 4 Drawing Sheets

Related U.S. Application Data (60) Provisional application No. 63/107,945, filed on Oct. 30, 2020.

(51) Int. Cl.

| | | |
|---|---|---|
| *B32B 5/02* | (2006.01) | |
| *B32B 5/08* | (2006.01) | |
| *B32B 7/12* | (2006.01) | |
| *B32B 15/085* | (2006.01) | |
| *B32B 15/14* | (2006.01) | |
| *B32B 15/20* | (2006.01) | |
| *B32B 17/06* | (2006.01) | |
| *E04D 5/10* | (2006.01) | |
| *B32B 13/12* | (2006.01) | |
| *B32B 13/14* | (2006.01) | |
| *B32B 21/08* | (2006.01) | |
| *B32B 21/10* | (2006.01) | |
| *B32B 27/32* | (2006.01) | |
| *B32B 27/34* | (2006.01) | |
| *B32B 27/36* | (2006.01) | |

(52) U.S. Cl.
CPC .............. *B32B 7/12* (2013.01); *B32B 15/085* (2013.01); *B32B 15/14* (2013.01); *B32B 15/20* (2013.01); *B32B 17/061* (2013.01); *B32B 13/12* (2013.01); *B32B 13/14* (2013.01); *B32B 17/062* (2013.01); *B32B 21/08* (2013.01); *B32B 21/10* (2013.01); *B32B 27/32* (2013.01); *B32B 27/34* (2013.01); *B32B 27/36* (2013.01); *B32B 2255/06* (2013.01); *B32B 2255/08* (2013.01); *B32B 2255/26* (2013.01); *B32B 2262/0253* (2013.01); *B32B 2262/101* (2013.01); *B32B 2262/144* (2021.05); *B32B 2307/71* (2013.01); *B32B 2307/7265* (2013.01); *B32B 2307/732* (2013.01); *E04D 5/10* (2013.01)

(58) Field of Classification Search
CPC .... E04D 2001/3435; E04D 2001/3447; E04D 3/18; E04D 3/351; E04D 3/352; E04D 3/354
See application file for complete search history.

(56) References Cited

U.S. PATENT DOCUMENTS

| | | | | |
|---|---|---|---|---|
| 4,039,706 A ‡ | 8/1977 | Tajima | B32B 37/24 | 428/40.3 |
| 4,585,682 A ‡ | 4/1986 | Colarusso | B32B 7/12 | 428/57 |
| 4,622,253 A ‡ | 11/1986 | Levy | A41D 31/04 | 428/95 |
| 4,656,082 A ‡ | 4/1987 | Goodacre | B32B 15/12 | 442/232 |
| 4,755,409 A * | 7/1988 | Harkness | D06N 5/00 | 428/494 |
| 5,142,837 A ‡ | 9/1992 | Simpson | E04D 5/10 | 428/491 |
| 6,286,280 B1 * | 9/2001 | Fahmy | E04D 11/02 | 52/309.3 |
| 6,673,432 B2 ‡ | 1/2004 | Kiik | C03C 25/48 | 428/458 |
| 6,764,968 B1 ‡ | 7/2004 | Hindi | B32B 5/024 | 442/37 |
| 6,797,356 B2 ‡ | 9/2004 | Zupon | B32B 15/14 | 428/137 |
| 6,901,712 B2 ‡ | 6/2005 | Lionel | B32B 7/02 | 428/40.1 |
| 7,641,952 B2 ‡ | 1/2010 | O'Rourke | E06B 1/62 | 428/41.5 |
| 8,287,984 B2 ‡ | 10/2012 | Grall | E04D 12/002 | 52/408 |
| 8,778,462 B2 ‡ | 7/2014 | Brabbs | B05D 3/108 | 427/508 |
| 9,314,994 B2 ‡ | 4/2016 | Strait | B32B 15/14 | |
| 9,758,960 B2 ‡ | 9/2017 | Khan | B32B 27/12 | |
| 10,245,816 B2 ‡ | 4/2019 | Kalkanoglu | B32B 5/022 | |
| 10,301,828 B2 ‡ | 5/2019 | Shepherd | B32B 7/12 | |
| 11,441,316 B2 * | 9/2022 | Rufus | E04D 12/002 | |
| 2002/0037405 A1 ‡ | 3/2002 | Naipawer, III | B32B 27/32 | 428/351 |
| 2003/0124292 A1 ‡ | 7/2003 | Unterreiter | E04D 5/148 | 428/40.1 |
| 2003/0203145 A1 ‡ | 10/2003 | Zanchetta | B32B 11/00 | 428/40.1 |
| 2004/0009319 A1 ‡ | 1/2004 | Zanchetta | B32B 7/14 | 428/40.1 |
| 2004/0055240 A1 ‡ | 3/2004 | Kiik | B32B 5/26 | 52/545 |
| 2004/0081789 A1 ‡ | 4/2004 | Kim | E04D 5/14 | 442/236 |
| 2005/0170125 A1 ‡ | 8/2005 | Naipawer, III | B32B 7/12 | 428/41.7 |
| 2005/0202197 A1 ‡ | 9/2005 | Mohseen | B32B 11/00 | 428/40.1 |
| 2008/0152867 A1 ‡ | 6/2008 | Di Pede | E04D 5/10 | 428/141 |
| 2008/0248244 A1 ‡ | 10/2008 | Kalkanoglu | B32B 11/12 | 156/279 |
| 2009/0178355 A1 * | 7/2009 | Pugh | B32B 3/28 | 52/741.3 |
| 2009/0280320 A1 ‡ | 11/2009 | Thomas | B32B 29/02 | 428/336 |
| 2009/0320987 A1 * | 12/2009 | Hubbard | B32B 15/14 | 428/354 |
| 2010/0227103 A1 * | 9/2010 | Hohmann, Jr. | C09J 7/29 | 428/141 |
| 2011/0003116 A1 * | 1/2011 | Drechsler | B32B 15/082 | 442/376 |
| 2011/0173910 A1 ‡ | 7/2011 | Franklin | B32B 27/065 | 52/309.1 |
| 2013/0098429 A1 ‡ | 4/2013 | Funayama | H02S 20/23 | 136/251 |
| 2013/0247490 A1 ‡ | 9/2013 | Strait | B32B 5/022 | 52/302.1 |
| 2014/0079929 A1 ‡ | 3/2014 | Thomas | B32B 15/20 | 428/219 |
| 2015/0024159 A1 * | 1/2015 | Bess | B32B 5/022 | 156/60 |
| 2015/0099411 A1 ‡ | 4/2015 | Yang | B29C 70/683 | 442/1 |
| 2015/0197884 A1 * | 7/2015 | Zhou | B32B 11/10 | 428/221 |
| 2017/0138040 A1 ‡ | 5/2017 | Groft | B32B 5/20 | |
| 2017/0210089 A1 ‡ | 7/2017 | Ennis | B32B 15/14 | |
| 2017/0260738 A1 ‡ | 9/2017 | Harrison | B32B 3/08 | |
| 2017/0267896 A1 ‡ | 9/2017 | Zhou | B32B 25/04 | |
| 2017/0298201 A1 ‡ | 10/2017 | Zhou | B32B 11/046 | |
| 2018/0313080 A1 ‡ | 11/2018 | Schmetzer | B32B 27/283 | |
| 2018/0320370 A1 ‡ | 11/2018 | Letts | B32B 15/14 | |
| 2019/0344542 A1 ‡ | 11/2019 | Seth | B32B 15/14 | |
| 2020/0123776 A1 ‡ | 4/2020 | Leatherman | E04D 1/28 | |
| 2021/0095474 A1 ‡ | 4/2021 | Yang | B32B 3/12 | |
| 2021/0172174 A1 ‡ | 6/2021 | Ackermann | B32B 27/30 | |
| 2021/0379876 A1 ‡ | 12/2021 | Boss | E04C 2/24 | |

\* cited by examiner
‡ imported from a related application

SELF-ADHERED ROOFING SYSTEMS AND METHODS

CROSS-REFERENCE TO RELATED APPLICATIONS

This application is a continuation of Ser. No. 17/515,812, filed Nov. 1, 2021, which claims priority to U.S. Provisional Application No. 63/107,945, filed on Oct. 30, 2020, the entire contents of which are incorporated herein by reference.

FIELD

The present disclosure relates to underlayments in self-adhered roofing systems and methods for manufacturing the underlayments.

BACKGROUND

Traditional roofing underlayments are positioned underneath roof coverings, such as shingles, metal, tiles, or membranes. In some instances, roofing underlayments may be used as a roof covering, itself.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim. Some embodiments of the present disclosure are directed to a roofing system comprising a deck, a roofing material, and an underlayment between the roofing material and the deck, wherein the underlayment comprises a non-woven surface layer, a foil layer, and an adhesive layer, wherein the adhesive layer comprises an asphaltic adhesive, wherein a top surface of the adhesive layer is attached to the foil layer, and wherein a bottom surface of the adhesive layer is attached to the deck.

In some embodiments, the adhesive layer comprises a thickness of 4 mils and 100 mils.

In some embodiments, the adhesive layer is a self-adhering adhesive.

In some embodiments, the roofing material comprises a shingle, a waterproofing membrane, or a tile.

In some embodiments, the non-woven surface layer is UV resistant.

In some embodiments, the non-woven surface layer is IR reflective.

In some embodiments, the underlayment further comprises at least one polymer layer between the foil layer and the non-woven layer.

In some embodiments, the non-woven surface layer comprises polymer fibers, natural fibers, glass fibers, or any combination thereof.

In some embodiments, the foil layer comprises aluminum.

In some embodiments, the foil layer comprises a thickness of 1 µm to 100 µm.

In some embodiments, the foil layer is a fire barrier.

Some embodiments of the present disclosure are directed to a roofing system comprising a deck, a roofing material, and an underlayment between the roofing material and the deck, wherein the underlayment comprises a non-woven surface layer, a foil layer, and an adhesive layer, wherein the adhesive layer comprises butyl adhesive, wherein the adhesive layer is attached to the foil layer, and wherein the adhesive layer is attached to the deck.

In some embodiments, the adhesive layer comprises a thickness of 4 mils and 100 mils.

In some embodiments, the foil layer comprises a thickness of 1 µm to 100 µm.

Some embodiments of the present disclosure are directed to a roofing underlayment comprising a non-woven surface layer, an adhesive layer, wherein the adhesive layer comprises an asphaltic adhesive, a butyl adhesive, or any combination thereof, and a foil layer, wherein the foil layer is between the non-woven surface layer and the adhesive layer, wherein the foil layer is attached to a top surface of the adhesive layer; and a removable cover attached to the bottom surface of the adhesive layer, wherein the roofing underlayment is configured to attach to a roof deck.

In some embodiments, the roofing underlayment further comprises a polymer layer positioned between the non-woven surface layer and the foil layer.

In some embodiments, the polymer layer comprises a UV stabilizer.

In some embodiments, the polymer layer comprises a thermal stabilizer.

In some embodiments, the polymer layer comprises a fire retardant.

In some embodiments, the foil layer comprises a thickness of 1 µm to 100 µm.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

All prior patents, publications, and test methods referenced herein are incorporated by reference in their entireties.

As used herein, the term "roofing material" includes, but is not limited to, shingles, waterproofing membranes, underlayment, and tiles.

As used herein, the term "attached" means that two surfaces are in sufficient contact with each other to provide any attachment or bond strength or range of attachment or bond strengths described herein.

As used herein, the term "breathable" means permeable to vapors, including without limitation water vapor, and other gasses.

As used here, the term "asphaltic adhesive layer" means a layer of adhesive containing asphalt.

As used herein, the term "self-adhering adhesive" means an adhesive that is configured to attach materials together without additional attachment means.

Some embodiments of the present disclosure relate to a roofing system. The roofing system may include a deck, a roofing material, and an underlayment. In some embodiments, the deck include plywood or any other wood, an International Standards Organizations (ISO) material, metal, concrete or any combination thereof that may be configured to be positioned under and support the roofing material and the underlayment. In some embodiments, the roofing material may include, but is not limited to, shingles, waterproofing membranes, underlayment, and tiles.

In some embodiments of the roofing system, the underlayment may be a roofing material that may be configured to attach to the deck. In some embodiments, the underlayment may be a component of the roofing system that may be configured to be positioned between a roofing material and the deck. In such embodiments, the underlayment may be configured to attach to both the roofing material and to the deck. In some embodiments, the underlayment may be configured to act as a fire retardant. In some embodiments, the underlayment may be configured to meet the Class-A burning brand requirements as defined by ASTM E108 and UL790. In some embodiments, the underlayment may be configured to act as a leak barrier. In some embodiments, the underlayment may be configured to provide the leak barrier properties lists in ASTM D 1970.

In some embodiments, the underlayment may include one layer of material. In some embodiments, the underlayment may include at least two layers of material. In some embodiments, the underlayment may include a foil layer. In some embodiments, the foil layer may be any metal material that may be configured to act as a fire retardant. In some embodiments, the metal material of the foil layer may include aluminum, copper, tin, zinc, bronze, bronze alloy, steel, steel, alloy, silver, gold, platinum, or any combination thereof.

In some embodiments, the foil layer may have a thickness of 1 μm to 100 μm, of 1 μm to 90 μm, of 1 μm to 80 μm, of 1 μm to 70 μm, of 1 μm to 60 μm, of 1 μm to 50 μm, of 1 μm to 40 μm, of 1 μm to 30 μm, of 1 μm to 20 μm, or of 1 μm to 10 μm.

In some embodiments, the foil layer may have a thickness of 1 μm to 100 μm, of 10 μm to 100 μm, of 20 μm to 100 μm, of 30 μm to 100 μm, of 40 μm to 100 μm, of 50 μm to 100 μm, of 60 μm to 100 μm, of 70 μm to 100 μm, of 80 μm to 100 μm, or of 90 μm to 100 μm.

In some embodiments, the foil layer may have a thickness of 1 μm to 100 μm, of 10 μm to 90 μm, of 20 μm to 80 μm, of 30 μm to 70 μm, or of 40 μm to 60 μm.

In some embodiments, the underlayment may include an adhesive layer. In some embodiments, the adhesive layer may be attached to the foil layer. In some embodiments, the adhesive layer may be configured to be attached to the deck. In some embodiments, the adhesive layer may be made of any material that may be capable of attaching to both the foil layer and another material, including, for example the deck, a roofing material, or another layer of the underlayment. In some embodiments, the adhesive layer may be a self-adhering adhesive that may be configured to prove nail sealability, ice dam protection, leak barrier properties listed in ASTM D 1970, or combinations thereof. In some embodiments, the adhesive layer may include polyolefin polymer, poly-alpha-olefin (APAO/APO) polymer, Butyl, silicon monosulfide (SIS), poly(styrene-butdaniene-styrene) (SBS), styrene-ethylene-butylene-styrene (SEBS), styrene-butadiene rubber (SBR), ethylene vinyl acetate, poly vinyl acetate, acrylic adhesives, polyurethane, silane terminated polymer, asphaltic adhesives, hot melt adhesives, non-asphaltic adhesives, or any combination thereof.

In some embodiments, the adhesive layer may have a thickness of 1 mil to 100 mils, of 1 mil to 90 mils, of 1 mil to 80 mils, of 1 mil to 70 mils, of 1 mil to 60 mils, of 1 mil to 50 mils, of 1 mil to 40 mils, of 1 mil to 30 mils, of 1 mil to 20 mils, or of 1 mil to 10 mils.

In some embodiments, the adhesive layer may have a thickness of 1 mil to 100 mils, of 10 mils to 100 mils, of 20 mils to 100 mils, of 30 mils to 100 mils, of 40 mils to 100 mils, of 50 mils to 100 mils, of 60 mils to 100 mils, of 70 mils to 100 mils, of 80 mils to 100 mils, or of 90 mils to 100 mils.

In some embodiments, the adhesive layer may have a thickness of 1 mil to 100 mils, of 10 mils to 90 mils, of 20 mils to 80 mils, of 30 mils to 70 mils, or of 40 mils to 60 mils.

In some embodiments, the underlayment may further comprise a removable cover. In some embodiments, the removable cover may be removably attached to the adhesive layer. In some embodiments, the removable cover may comprise any material that may be configured to be attached to the adhesive layer and that may be configured to be removed from the adhesive layer without affecting the adhesive properties of the adhesive layer.

In some embodiments, the underlayment further comprises a non-woven layer. In some embodiments, the non-woven layer may be an outer surface of the underlayment. In some embodiments, the non-woven layer may be configured to be a non-slip walking surface of the underlayment. In some embodiments, the non-woven layer may be embossed or coated. In some embodiments, the non-woven layer may be configured to be UV resistant. In some embodiments, the non-woven layer may be configured to be IR reflective. In some embodiments, the non-woven layer may be configured to be both UV resistant and IR reflective. In some embodiments, the foil layer may be positioned between the non-woven surface layer and the adhesive layer. In some embodiments, the non-woven surface layer may include polyester, nylon, or other synthetic fibers, polyolefin, natural fibers, glass fibers or any combination thereof.

In some embodiments, the underlayment may include a reinforcement layer, which may be configured to provide support and/or reinforcement to the underlayment. In some embodiments, the reinforcement layer may be positioned between the non-woven layer and the foil layer. In some embodiments, the reinforcement layer may be positioned between the foil layer and the adhesive layer. In some embodiments, the reinforcement layer may be a scrim. In some embodiments, the reinforcement layer may include glass, polyester, nylon, non-woven polyolefin, non-woven polymer fiber composite, spun bond polymer fiber mats, or any combination thereof.

In some embodiments, the underlayment may include a polymer layer. In some embodiments, the polymer layer may be positioned between the non-woven layer and the reinforcement layer. In some embodiments, the polymer layer may be positioned between the non-woven layer and the foil layer. In some embodiments, the polymer layer may be any suitable material that may be configured to attach the non-woven layer to the reinforcement layer, including, for example, polyolefin, a polymer coating, or any combination thereof.

In some embodiments, the adhesive layer may be a first adhesive layer and the underlayment may further include a second adhesive layer. In some embodiments, the second adhesive layer may be configured to attach to the foil layer and to the reinforcement layer. In some embodiments, the second adhesive layer may include polyolefin polymer, poly-alpha-olefin (APAO/APO) polymer, Butyl, SIS, SBS, SEBS, SBR, ethylene vinyl acetate, poly vinyl acetate, acrylic adhesives, polyurethane, silane terminated polymer, asphaltic adhesives, hot melt adhesives, non-asphaltic adhesives, or any combination thereof.

In some embodiments, the second adhesive layer may have a thickness of 1 mil to 100 mils, of 1 mil to 90 mils, of 1 mil to 80 mils, of 1 mil to 70 mils, of 1 mil to 60 mils, of 1 mil to 50 mils, of 1 mil to 40 mils, of 1 mil to 30 mils, of 1 mil to 20 mils, or of 1 mil to 10 mils.

In some embodiments, the second adhesive layer may have a thickness of 1 mil to 100 mils, of 4 mils to 100 mils, of 10 mils to 100 mils, of 20 mils to 100 mils, of 30 mils to 100 mils, of 40 mils to 100 mils, of 50 mils to 100 mils, of 60 mils to 100 mils, of 70 mils to 100 mils, of 80 mils to 100 mils, or of 90 mils to 100 mils.

In some embodiments, the second adhesive layer may have a thickness of 1 mil to 100 mils, of 4 mils to 100 mils, of 10 mils to 90 mils, of 20 mils to 80 mils, of 30 mils to 70 mils, or of 40 mils to 60 mils.

In some embodiments, the underlayment may further include a third adhesive layer. In some embodiments, the foil layer may be positioned between the second and third adhesive layers and the reinforcement layer may be positioned between the first and second adhesive layers. In some embodiments, the third adhesive layer may be configured to attach to the foil layer and to the polymer layer. In some embodiments, the third adhesive layer may include polyolefin polymer, poly-alpha-olefin (APAO/APO) polymer, Butyl, SIS, SBS, SEBS, and/or SBR; adhesives such as ethylene vinyl acetate, poly vinyl acetate, and/or acrylic adhesives; polyurethane, silane terminated polymer, asphaltic adhesives, hot melt adhesives, non-asphaltic adhesives, or any combination thereof.

In some embodiments, the third adhesive layer may have a thickness of 1 mil to 100 mils, of 1 mil to 90 mils, of 1 mil to 80 mils, of 1 mil to 70 mils, of 1 mil to 60 mils, from 1 mil to 50 mils, of 1 mil to 40 mils, of 1 mil to 30 mils, of 1 mil to 20 mils, or of 1 mil to 10 mils.

In some embodiments, the third adhesive layer may have a thickness of 1 mil to 100 mils, of 10 mils to 100 mils, of 20 mils to 100 mils, of 30 mils to 100 mils, of 40 mils to 100 mils, of 50 mils to 100 mils, of 60 mils to 100 mils, of 70 mils to 100 mils, of 80 mils to 100 mils, or of 90 mils to 100 mils.

In some embodiments, the third adhesive layer may have a thickness of 1 mil to 100 mils, of 2 mils to 100 mils, of 10 mils to 90 mils, of 20 mils to 80 mils, of 30 mils to 70 mils, or of 40 mils to 60 mils.

In some embodiments, the underlayment may include at least one breathable layer. In some embodiments the polymer layer may be breathable. In some embodiments the foil layer may be breathable. In some embodiments, the first, second, or third adhesive layers may be breathable.

In some embodiments, the underlayment may include a UV stabilizer. In some embodiments, the UV stabilizer may be a UV absorber, a hindered amine light stabilizer, or combinations thereof. In some embodiments, the UV stabilizer may be included in the polymer layer, the non-woven layer, the reinforcement layer, the first, second or third adhesive layers (collectively, the "underlayment layers"), or any combination thereof.

In some embodiments one or more of the underlayment layers may include a UV stabilizer in an amount of 0.1% to 70%, of 0.1% to 60%, of 0.1% to 50%, of 0.1% to 40%, of 0.1% to 30%, of 0.1% to 20%, of 0.1% to 10%, or of 0.1% to 1%.

In some embodiments an underlayment layer may include a UV stabilizer in an amount of 0.1% to 70%, of 1% to 70%, of 10% to 70%, of 20% to 70%, of 30% to 70%, of 40% to 70%, of 50% to 70%, or of 60% to 70%.

In some embodiments an underlayment layer may include a UV stabilizer in an amount of 0.1% to 70%, of 1% to 60%, of 10% to 50%, or of 20% to 40%.

In some embodiments, the underlayment may include a fire retardant. In some embodiments, the fire retardant may be included in any underlayment layer or any combination thereof.

In some embodiments an underlayment layer may include a fire retardant in an amount of 0.1% to 70%, of 0.1% to 60%, of 0.1% to 50%, of 0.1% to 40%, of 0.1% to 30%, of 0.1% to 20%, of 0.1% to 10%, or of 0.1% to 1%.

In some embodiments an underlayment layer may include a fire retardant in an amount of 0.1% to 70%, of 1% to 70%, of 10% to 70%, of 20% to 70%, of 30% to 70%, of 40% to 70%, of 50% to 70%, or of 60% to 70%.

In some embodiments an underlayment layer may include a fire retardant in an amount of 0.1% to 70%, of 1% to 60%, of 10% to 50%, or of 20% to 40%.

In some embodiments, the underlayment may include a thermal stabilizer. In some embodiments, the thermal stabilizer may be included in one of the underlayment layers or in any combination thereof.

In some embodiments an underlayment layer may include a thermal stabilizer in an amount of 0.1% to 10%, of 0.1% to 9%, of 0.1% to 8%, of 0.1% to 7%, of 0.1% to 6%, of 0.1% to 5%, of 0.1% to 4%, of 0.1% to 3%, of 0.1% to 2%, or of 0.1% to 1%.

In some embodiments an underlayment layer may include a thermal stabilizer in an amount of 0.1% to 10%, of 1% to 10%, of 2% to 10%, of 3% to 10%, of 4% to 10%, of 5% to 10%, of 6% to 10%, of 7% to 10%, of 8% to 10%, or of 9% to 10%.

In some embodiments an underlayment layer may include a thermal stabilizer in an amount of 0.1% to 10%, of 1% to 9%, of 2% to 8%, of 3% to 7%, or of 4% to 6%.

In some embodiments, the underlayment may include IR reflective pigments. In some embodiments, the IR reflective pigments may be included in one of the underlayment layers or in any combination thereof.

In some embodiments an underlayment layer may include IR reflective pigments in an amount of 0.1% to 10%, of 0.1% to 9%, of 0.1% to 8%, of 0.1% to 7%, of 0.1% to 6%, of 0.1% to 5%, of 0.1% to 4%, of 0.1% to 3%, of 0.1% to 2%, or of 0.1% to 1%.

In some embodiments an underlayment layer may include IR reflective pigments in an amount of 0.1% to 10%, of 1% to 10%, of 2% to 10%, of 3% to 10%, of 4% to 10%, of 5% to 10%, of 6% to 10%, of 7% to 10%, of 8% to 10%, or of 9% to 10%.

In some embodiments an underlayment layer may include IR reflective pigments in an amount of 0.1% to 10%, of 1% to 9%, of 2% to 8%, of 3% to 7%, or of 4% to 6%.

In some embodiments, the underlayment may include biocides. In some embodiments, the biocides may be included in one of the underlayment layers or in any combination thereof.

In some embodiments an underlayment layer may include biocides in an amount of 0.1% to 10%, of 0.1% to 9%, of 0.1% to 8%, of 0.1% to 7%, of 0.1% to 6%, of 0.1% to 5%, of 0.1% to 4%, of 0.1% to 3%, of 0.1% to 2%, or of 0.1% to 1%.

In some embodiments an underlayment layer may include biocides in an amount of 0.1% to 10%, of 1% to 10%, of 2% to 10%, of 3% to 10%, of 4% to 10%, of 5% to 10%, of 6% to 10%, of 7% to 10%, of 8% to 10%, or of 9% to 10%.

In some embodiments an underlayment layer may include biocides in an amount of 0.1% to 10%, of 1% to 9%, of 2% to 8%, of 3% to 7%, or of 4% to 6%.

In some embodiments, the underlayment may include five layers. In some embodiments, the first layer may be a non-woven layer, the second layer may be a polymer layer, including, for example, a polymer coating, the third layer may be a foil layer, the fourth layer may be an adhesive layer, and the fifth layer may be a removable cover. In some embodiments, the first layer may be a non-woven layer, including for example, a spun bond polymer fiber mat with reinforcement in the machine direction, a spun bond polymer fiber mat with reinforcement in the cross direction, or a spun bond polymer fiber mat with reinforcement in both the machine direction and the cross direction, the second layer may be a polymer layer, including for example, a polymer coating, the third layer may be a foil layer, the fourth layer may be an adhesive layer, and the fifth layer may be a removable cover. In some embodiments, the first layer may be a non-woven layer, including for example, a coated glass mat, the second layer may be a polymer layer, including for example, a polymer coating, the third layer may be a foil layer, the fourth layer may be an adhesive layer, and the fifth layer may be a removable cover. In some embodiments, the first layer may be a non-woven layer, the second layer may be polymer layer, including for example, a breathable polymer coating, the third layer may be a foil layer, the fourth layer may be a breathable adhesive, and the fifth layer may be a removable cover.

In some embodiments, the underlayment may include seven layers. The first layer may be a non-woven layer, the second layer may be a polymer coating, the third layer may be a reinforcement layer, the fourth layer may be a polymer coating, the fifth layer may be a metal foil, the sixth layer may be an adhesive, and the seventh layer may be a removable cover.

In some embodiments, the underlayment may include at least one breathable layer. In some embodiments, the first layer of the underlayment may be a non-woven layer, the second layer may be a breathable polymer layer, the third layer may be a reinforcement layer, which may include a rough glass or metal scrim. In some embodiments, the fourth layer may be another breathable polymer layer. In some embodiments, the fifth layer may be a foil layer. In some embodiments, the reinforcement layer may be configured to patriate the foil layer or break the foil layer at various locations to make the foil layer breathable. In some embodiments, the sixth layer may be a breathable adhesive layer, and the seventh layer may be a removable cover.

Some embodiments of the present disclosure relate to a method of forming a roofing system. In some embodiments, the method may include the step of forming, e.g., manufacturing, an underlayment. In some embodiments, manufacturing the underlayment may include manufacturing an underlayment having one or more layers. For example, in some embodiments, the underlayment may include at least five layers, including a foil layer and an adhesive layer that may be attached to the foil layer. In some embodiments, the underlayment may be manufactured by lamination, extrusion, co-extrusion, coating, or any combination thereof.

In some embodiments, manufacturing the underlayment may include forming an underlayment having at least one breathable layer. In some embodiments, manufacturing the underlayment may including forming a breathable foil layer. In some embodiments, the breathable foil layer may be formed by embossing the foil layer. In some embodiments, the breathable foil layer may be formed by adjusting line tension and/or lamination conditions. In some embodiments, the breathable foil layer may be formed by cutting the foil layer after the foil layer has been attached (e.g., by lamination) to a polymer layer by brushing the foil layer with a sharp object, including without limitation, a wire, such that the foil layer, but not the polymer layer, may be cut to achieve a desired breathability.

In some embodiments, the breathable foil layer may be formed by adding mineral particles having a Mohs hardness of 3.5 or more to a polymer coating, and then attaching (e.g., by laminating) the polymer coating to the foil layer, such that the mineral particles in the polymer coating penetrate the foil layer. In some embodiments, the mineral particles may be added to the polymer coating by adding the mineral particles into the polymer coating when it is wet and/or hot. In some embodiments, the mineral particles may be added to the polymer coating by mixing the mineral particles with the polymer coating. In some embodiments, the mineral particles may be block minerals particles. In some embodiments, the mineral particles may be particles that may be sized such that they may protrude through the polymer coating. In some embodiments, the surface coverage of the mineral particles in the polymer coating may be from 10% to 50%, from 10% to 40%, from 10% to 30%, from 10% to 20%, from 20% to 50%, from 30% to 50%, or from 20% to 30%.

The present disclosure will now be described with reference to non-limiting exemplary embodiments depicted in FIGS. 1 and 2.

Figure 1:
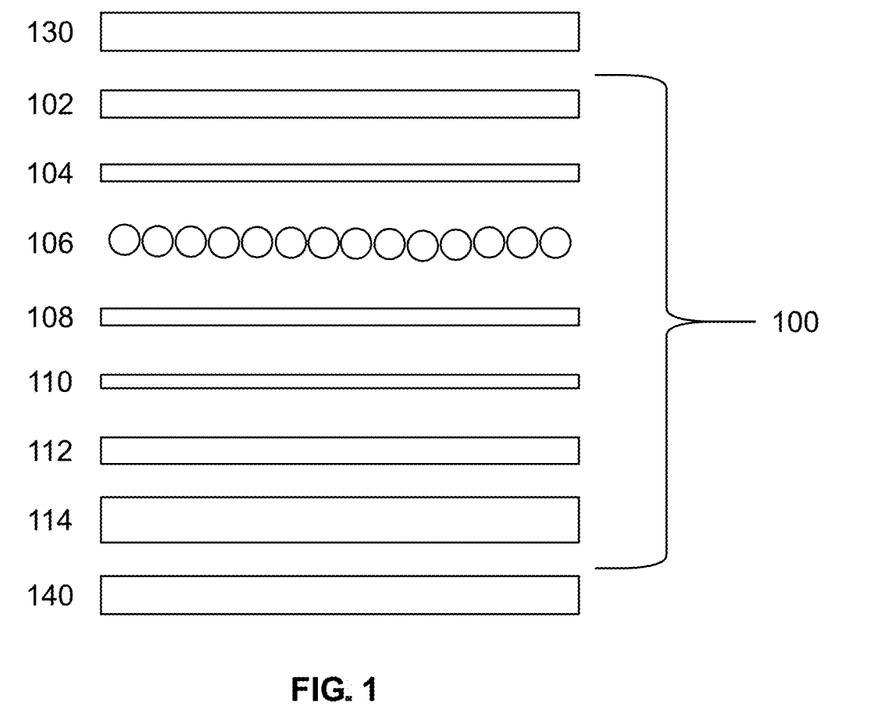
FIG. 1 is a cross-sectional, exploded view of an exemplary embodiment of a roofing underlayment according to the present disclosure.

FIG. 1 depicts a cross-section of the layers of an exemplary embodiment of an underlayment 100 according to the present disclosure. As shown in FIG. 1, an exemplary embodiment of the underlayment may include seven layers (102, 104, 106, 108, 110, 112, and 114). In the exemplary embodiment of FIG. 1, the first layer 102 may be a non-woven layer, the second layer 104 may be a polymer layer, including for example, polyolefin, the third layer 106 may be a reinforcement layer, such as a scrim, the fourth layer 108 may be another polymer layer, including for example, polyolefin, the fifth layer 110 may be a second adhesive layer, the sixth layer 112 may be a foil layer, and the seventh layer 114 may be a first adhesive layer.

In the exemplary embodiment of FIG. 1, the first adhesive layer 114 may be polyolefin polymer, poly-alpha-olefin (APAO/APO) polymer, Butyl, SIS, SBS, SEBS, SBR, ethylene vinyl acetate, poly vinyl acetate, acrylic adhesives; polyurethane, silane terminated polymer, asphaltic adhesives, hot melt adhesives, non-asphaltic adhesives, or any combination thereof. The second adhesive layer 110 may be a hot melt adhesive, including but not limited to polyolefins, acrylics, thermoplastic elastomers, melamines, epoxies, polyolefins with maleic anhydride, thermoplastic polyurethanes ("TPU"), or any combinations thereof.

In the exemplary embodiment of FIG. 1, the first adhesive layer 114 may be configured to attach to a roof deck and to the foil layer. In addition, the first adhesive layer 114 may have a thickness of 1 mil to 100 mils, and the second adhesive layer 110 may have a thickness of 1 mil to 25 mils.

Figure 2:
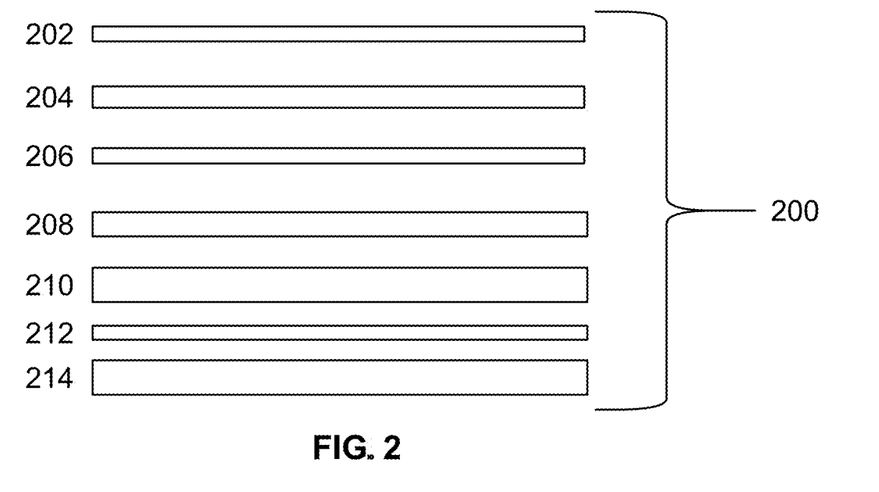
FIG. 2 is a cross-sectional, exploded view of another exemplary embodiment of a roofing underlayment according to the present disclosure.

FIG. 2 depicts a cross-section of the layers of another exemplary embodiment of an underlayment 200 according to the present disclosure. As shown in FIG. 2, an exemplary embodiment of the underlayment may include seven layers (202, 204, 206, 208, 210, 212, and 214). In the exemplary embodiment of FIG. 2, the first layer 202 may be a non-woven layer, the second layer 204 may be a polymer layer, including, for example, polyolefin, the third layer 206 may be a third adhesive layer, the fourth layer 208 may be a foil layer, the fifth layer 210 may be a second adhesive layer, the sixth layer 212 may be a reinforcement layer, including for example, glass, and the seventh layer 214 may be a first adhesive layer.

In the exemplary embodiment of FIG. 2, the first adhesive layer 214 may be polyolefin polymer, poly-alpha-olefin (APAO/APO) polymer, Butyl, SIS, SBS, SEBS, SBR, ethylene vinyl acetate, poly vinyl acetate, acrylic adhesives; polyurethane, silane terminated polymer, asphaltic adhesives, hot melt adhesives, non-asphaltic adhesives, or any combination thereof. In addition, the first adhesive layer may be configured to meet the standards set forth in ASTM D 1970. The second adhesive layer 210 may be a hot melt adhesive, including but not limited to polyolefins, ethylene-vinyl acetates (EVAs), acrylics, thermoplastic elastomers, melamines, epoxies, polyolefins with maleic anhydride thermoplastic polyurethanes (TPUs) with UV and thermal stabilizers with and without fire retardants (e.g., colemanite, metal hydroxides, metal hydrates, magnesium hydroxide, aluminum tri-hydrate, ammonium polyphosphate, or expandable graphite), or any combination thereof. The third adhesive 206 layer may be a hot melt adhesive, including but not limited to polyolefins, acrylics, thermoplastic elastomers, melamines, epoxies, polyolefins with maleic anhydride TPUs, and any combinations thereof.

In the exemplary embodiment of FIG. 2, the first adhesive layer 214 may be configured to attach to a roof deck. The second adhesive layer 210 may be configured to attach to the reinforcement layer 212 and the foil layer 208. In addition, the first adhesive layer 214 may have a thickness of 4 mils to 100 mils the second adhesive layer 210 may have a thickness of 1 mil to 25 mils and the third adhesive layer 206 may have a thickness of 1 mil to 25 mils.

EXAMPLES

Exemplary embodiments of the present disclosure are described with reference to the following examples. Three sample underlayment were prepared, and the color of each sample was tested when the samples were prepared and after the samples aged for two weeks as described herein.

The three samples were prepared as follows. Sample 1: an asphaltic adhesive layer was applied to a bottom surface of a non-woven surface layer. Sample 2: a polymer layer was applied to a bottom surface of a non-woven surface layer, and an asphaltic adhesive layer was applied to the polymer layer. The polymer layer comprised polyethylene. Sample 3: an aluminum foil layer was applied to a bottom surface of a non-woven surface layer, and an asphaltic adhesive layer was applied to the aluminum foil layer to form an underlayment according to an embodiment of the present disclosure.

The color of Sample 1-3 was measured, and the results are shown in table 1 below. In particular, as shown in table 1, for each of Samples 1-3, measurements were obtained for the brightness (Y), the Whiteness Index according to ASTM E313 at D65/10 (WI E313), and the Yellow Index according to ASTM E313 at D65/10 (YI E313) and ASTM D1925 at C/2 (YI D1925).

TABLE 1

|  | Sample 1 | Sample 2 | Sample 3 |
|---|---|---|---|
| WI E313 | 188.4 | 80.3 | 127 |
| Y | 20.8 | 24.5 | 47.9 |
| YI E313 | −107.1 | −41.3 | −58.1 |
| YI D1925 | −117.7 | −45.1 | −64.1 |

Figure 3:
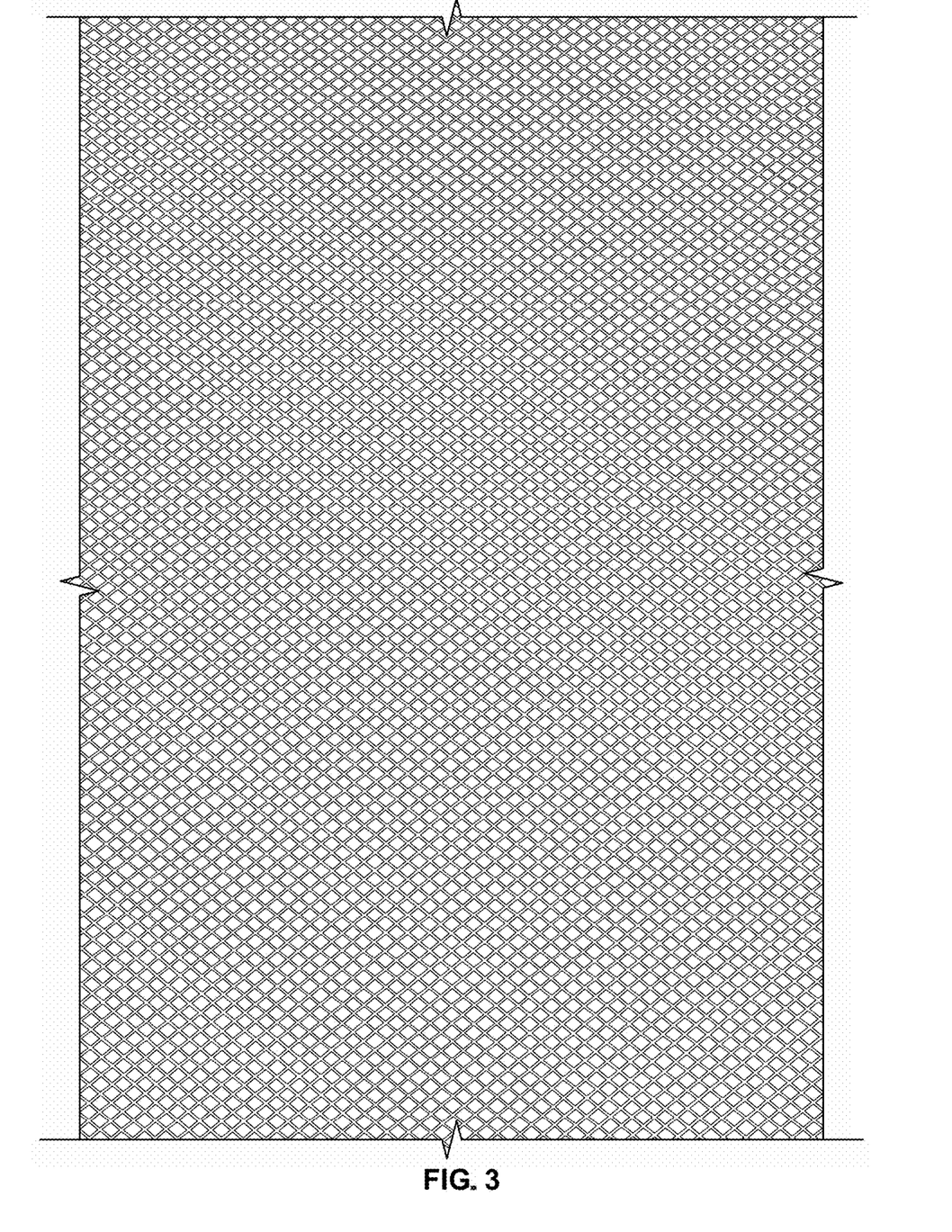
FIG. 3 depicts an underlayment comprising a non-woven surface layer attached to an asphaltic adhesive layer.
Figure 4:
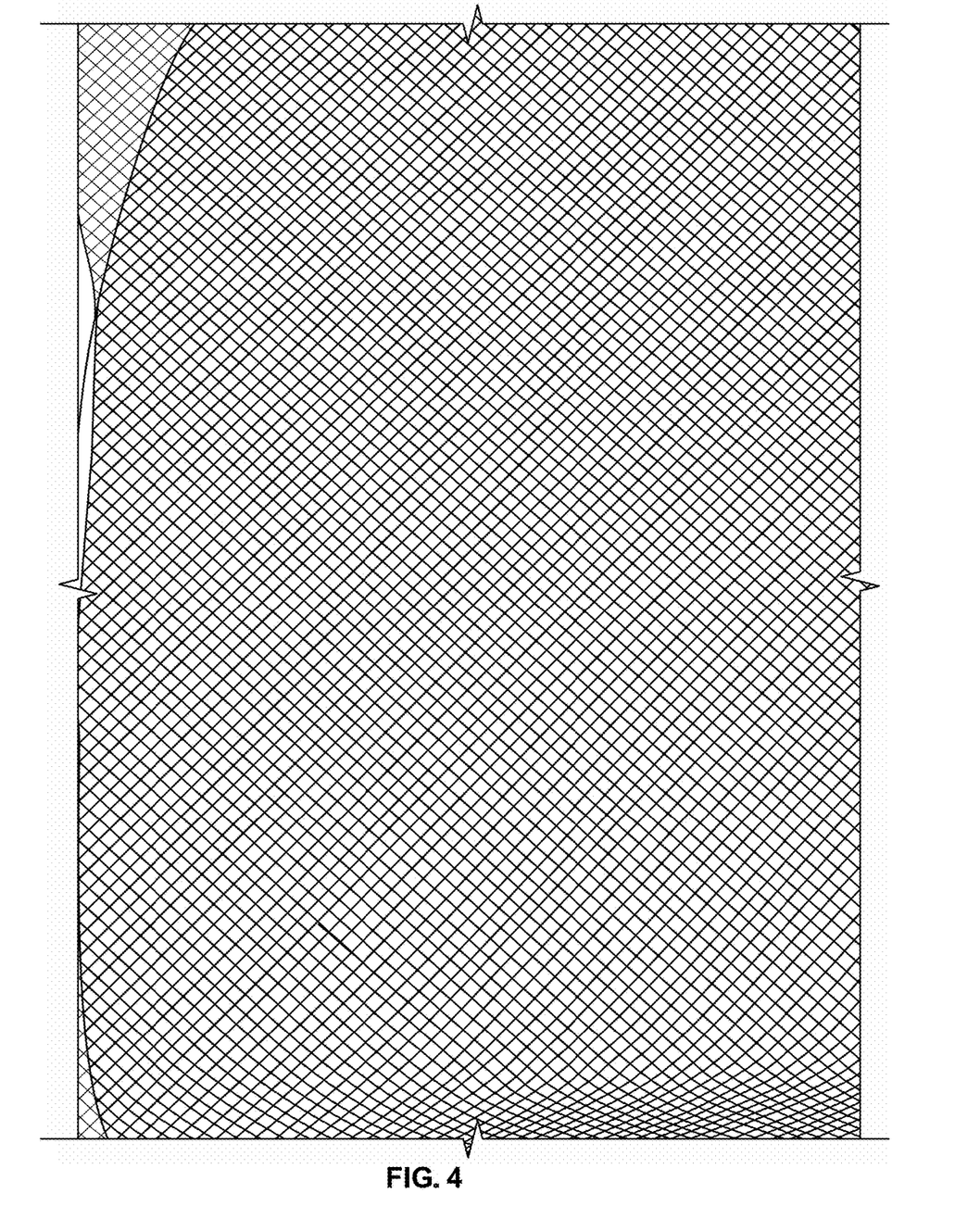
FIG. 4 depicts an underlayment comprising a non-woven surface layer, an asphaltic adhesive layer, and a polyethylene layer between the non-woven surface layer and the asphaltic adhesive layer.
Figure 5:
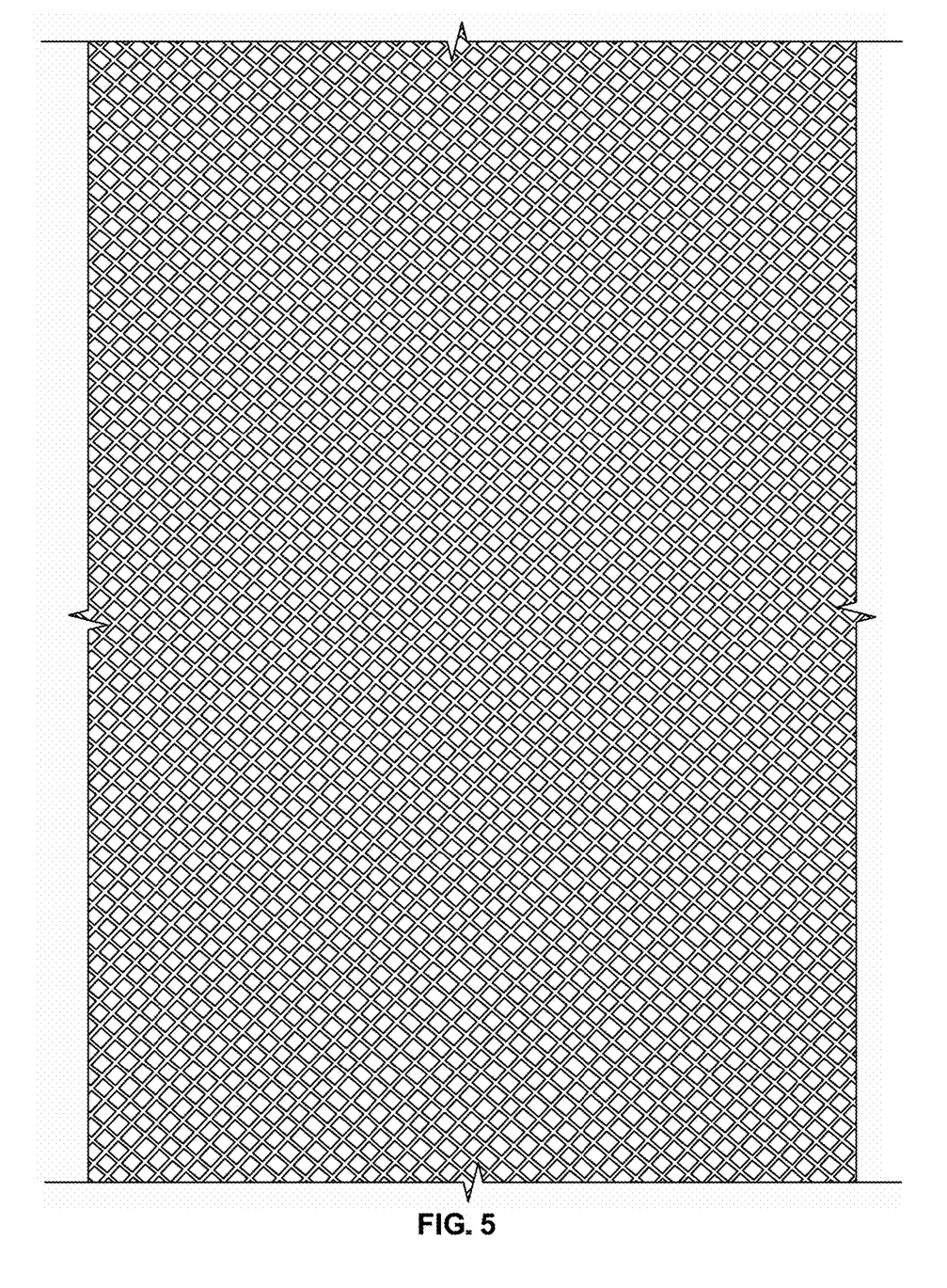
FIG. 5 depicts an underlayment according to an exemplary embodiment of the present disclosure comprising a non-woven surface layer, an asphaltic adhesive layer, and an aluminum foil layer between the non-woven surface layer and the asphaltic adhesive layer.

Samples 1-3 were aged for two weeks at 120° F., and the color of each of Sample 1-3 was measured again to obtain the Whiteness Index, Yellow Index, and Brightness according to the same test methods used upon formation of Samples 1-3. The color measurement results of Samples 1-3 after two weeks of aging at 120° F. are shown in table 2 below. In addition, images of Samples 1-3 after two weeks of aging at 120° F. are shown in FIGS. 3-5, respectfully.

TABLE 2

|  | Sample 1 (FIG. 3) | Sample 2 (FIG. 4) | Sample 3 (FIG. 5) |
|---|---|---|---|
| WI E313 | 174.1 | 70.3 | 127.3 |
| Y | 14.6 | 25.4 | 48.7 |
| YI E313 | −99.6 | −36.5 | −58.2 |
| YI D1925 | −108.3 | −40.2 | −64.3 |

The results show that the color of Samples 1 and 2 deteriorated during the two weeks of aging. In contrast, the color the underlayment of Sample 3 did not significantly change during the two weeks of aging.

The images in FIGS. 3-5 confirm these results. FIGS. 3-5 depict the non-woven surface layers of each of Samples 1-3, respectively. As shown in FIGS. 3 and 4, the non-woven surface layers appear non-white or black in certain portions. The non-white or black portions represent migration of the asphaltic adhesive from the adhesive layer through the underlayment to the non-woven surface layer. In contrast, Sample 3, shown in FIG. 5, has a white non-woven surface layer.

The examples and test results discussed herein confirms that in some embodiments of the present disclosure, an underlayment having a foil layer between a non-woven surface layer and an adhesive layer reduces migration of the adhesive in the adhesive layer through the underlayment to the non-woven surface layer.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed:

1. A roofing system comprising:
   a deck;
   a roofing material; and
   an underlayment between the roofing material and the deck, wherein the underlayment comprises:
   a non-woven surface layer,
   a first polymer layer,
   a second polymer layer,
   a foil layer,
   a first adhesive layer, and
   a second adhesive layer,
      wherein the first adhesive layer comprises an asphaltic adhesive or butyl adhesive,
      wherein a top surface of the first adhesive layer contacts the foil layer,
      wherein a bottom surface of the second adhesive layer contacts the foil layer,
      wherein the first polymer layer is disposed above the second adhesive layer,
      wherein the non-woven surface layer is disposed above the first polymer layer,
      wherein the non-woven surface layer contacts the second polymer layer, and
      wherein the roofing material contacts a top surface of the non-woven surface layer.

2. The roofing system of claim 1, further comprising:
   a reinforcement layer,
      wherein the reinforcement layer contacts the first polymer layer and the second polymer layer.

3. The roofing system of claim 2, wherein the reinforcement layer comprises a scrim layer.

4. The roofing system of claim 1, wherein the roofing material comprises a shingle, a waterproofing membrane, or a tile.

5. The roofing system of claim 1, wherein the non-woven surface layer is at least one of resistant to ultraviolet light, and reflective of infrared light.

6. The roofing system of claim 1, wherein the non-woven surface layer comprises polymer fibers, natural fibers, glass fibers, or any combination thereof.

7. The roofing system of claim 1, wherein the foil layer comprises aluminum, and
   wherein the foil layer comprises a thickness of 1 µm to 100 µm.

8. The roofing system of claim 1, wherein at least one of the first and second adhesive layers are breathable.

9. The roofing system of claim 1, wherein the first adhesive layer is breathable,
   wherein the second adhesive layer is breathable.

* * * * *